(12) United States Patent
Duett et al.

(10) Patent No.: US 7,711,576 B1
(45) Date of Patent: May 4, 2010

(54) INDETERMINATE OUTCOME MANAGEMENT IN PROBLEM MANAGEMENT IN SERVICE DESK

(75) Inventors: Karena L. Duett, Grain Valley, MO (US); Markley T. Henning, Shawnee, KS (US); Kathryn E. Thompson, Prairie Village, KS (US); Rodney J. Stoverink, Belton, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 1223 days.

(21) Appl. No.: 11/243,570

(22) Filed: Oct. 5, 2005

(51) Int. Cl.
*G06Q 10/00* (2006.01)
(52) U.S. Cl. .......................................... 705/1; 707/102
(58) Field of Classification Search ...................... 705/1; 707/102, 47
See application file for complete search history.

(56) References Cited

U.S. PATENT DOCUMENTS 5,717,835 A * 2/1998 Hellerstein .................... 706/46
6,463,441 B1 * 10/2002 Paradies ...................... 707/102
6,876,993 B2 * 4/2005 LaButte et al. ................. 706/47
2002/0123983 A1 * 9/2002 Riley et al. ...................... 707/1
2003/0149550 A1 * 8/2003 Famili et al. ................. 702/188

OTHER PUBLICATIONS http://www.gov.on.ca/mgs/en/IAndIT/STEL02_047303.html TRM GO-ITS 44 ITSM Terminology Reference Model Portable Guide V1.0. Apr. 2005.*

* cited by examiner

*Primary Examiner*—John G. Weiss
*Assistant Examiner*—Sangeeta Bahl (57) ABSTRACT

A computer-implemented method for managing problem tickets is provided. The method includes placing a first ticket for a first problem for which a root cause cannot be determined in an indeterminate category, placing a second ticket for a second problem for which a solution cannot be found in an unsolvable category, and placing a third ticket for a third problem for which a solution can be found but will not be implemented in the unsolvable category and closing the tickets. The method further includes reexamining based on the occurrence of a reexamining condition one of the tickets and determining whether a reopening condition has occurred. Additionally, the method includes reopening one of the tickets when the reopening condition is determined to have occurred and implementing one of an identified potential solution for the reopened ticket and a trend analysis for a group of tickets that include the reopened ticket.

20 Claims, 5 Drawing Sheets

INDETERMINATE OUTCOME MANAGEMENT IN PROBLEM MANAGEMENT IN SERVICE DESK

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure relates to problem management systems. More specifically, but not by way of limitation, a method and a system are provided that manage indeterminate and unsolvable problems in a problem management system.

BACKGROUND OF THE INVENTION

In the operation of computing software, computing hardware, or other complex systems, incidents or problems impacting a desired outcome can arise. An enterprise operating such a system might have a problem management system in place to assist in identifying and resolving the incidents or problems. An incident may be defined as an occurrence that has a negative impact on a desired outcome. A problem may be defined as an underlying cause of one or more incidents. Several commercially available products, such as HP OpenView Service Desk, are available to automate and standardize the problem management process.

SUMMARY OF THE INVENTION

In one embodiment, a computer-implemented method for categorizing problem tickets is provided. The method includes for a first ticket for which a root cause cannot be determined, placing the first ticket in an indeterminate category and closing the first ticket. The method includes for a second ticket for which a solution cannot be found, placing the second ticket in an unsolvable category and closing the second ticket. The method includes for a third ticket for which a solution can be found but will not be implemented, placing the third ticket in the unsolvable category and closing the third ticket.

In another embodiment, a method for problem management is provided. The method includes identifying a problem and assigning the problem to a problem manager. The method includes attempting to isolate a root cause of the problem, and when the root cause cannot be isolated, placing a problem ticket describing the problem in an indeterminate category. When the root cause can be isolated, the method includes attempting to find a solution for the problem, and when a solution cannot be found, placing the problem ticket in an unsolvable category. When a solution can be found, the method includes determining based on a cost-benefit analysis whether the solution is substantially economically justified. The method includes when the solution is not economically justified, placing the ticket in the unsolvable category. When the solution can be economically justified, the method includes implementing the solution.

In yet another embodiment, a computer-implemented system for managing problems is disclosed. The system includes an indeterminate ticket repository operable to retain at least one problem ticket describing a problem for which a root cause cannot be identified. The system includes an unsolvable ticket repository operable to retain at least one problem ticket describing a problem for which a solution cannot be found and at least one problem ticket describing a problem for which a solution can be found but cannot feasibly be implemented. The system includes an automated search component operable to search for a trend in the problem tickets.

These and other features and advantages will be more clearly understood from the following detailed description taken in conjunction with the accompanying drawings and claims.

BRIEF DESCRIPTION OF THE DRAWINGS

For a more complete understanding of the presentation and the advantages thereof, reference is now made to the following brief description, taken in connection with the accompanying drawings in detailed description, wherein like reference numerals represent like parts.

DETAILED DESCRIPTION OF THE PREFERRED EMBODIMENTS

It should be understood at the outset that although an exemplary implementation of one embodiment of the present invention is illustrated below, the present system may be implemented using any number of techniques, whether currently known or in existence. The present disclosure should in no way be limited to the exemplary implementations, drawings, and techniques illustrated below, including the exemplary design and implementation illustrated and described herein, but may be modified within the scope of the appended claims along with their full scope of equivalents.

A problem management system might include procedures for identifying, logging, and prioritizing incidents and problems and for assigning incidents and problems to the appropriate resolution agent. The resolution agent might isolate the root cause of a problem, recommend solution alternatives, and ensure that the appropriate solutions are implemented. Records of the incidents and problems and of the solutions implemented to resolve them might be retained in one or more databases.

A problem management system such as HP OpenView Service Desk might be used to manage information and records pertaining to incidents and problems. Alternatively, numerous other commercially available products similar to Service Desk will be familiar to one of skill in the art and could be used as a problem management system. Tickets or similar problem records are typically used in such systems to record information related to incidents and problems. In previous systems, tickets for problems for which a root cause could not be identified, a solution could not be found, or a solution was not implemented would typically remain in an 'open' status indefinitely which created a number of challenges in managing problems.

In an embodiment, tickets for problems for which a root cause cannot be identified are placed in an 'indeterminate' status and closed. Tickets for problems for which a solution cannot be found and tickets for problems for which a solution cannot be feasibly implemented are placed in an 'unsolvable' status and closed. An appropriate level of due diligence is performed to ensure that reasonable options have been examined before a ticket is placed in an indeterminate or unsolvable status. Trend analysis can be performed on tickets that have been placed in an indeterminate or unsolvable status to determine whether patterns or commonalities exist in the indeterminate or unsolvable problems. Tickets can be re-examined periodically to determine whether they can be removed from the indeterminate or unsolvable status.

Figure 1:
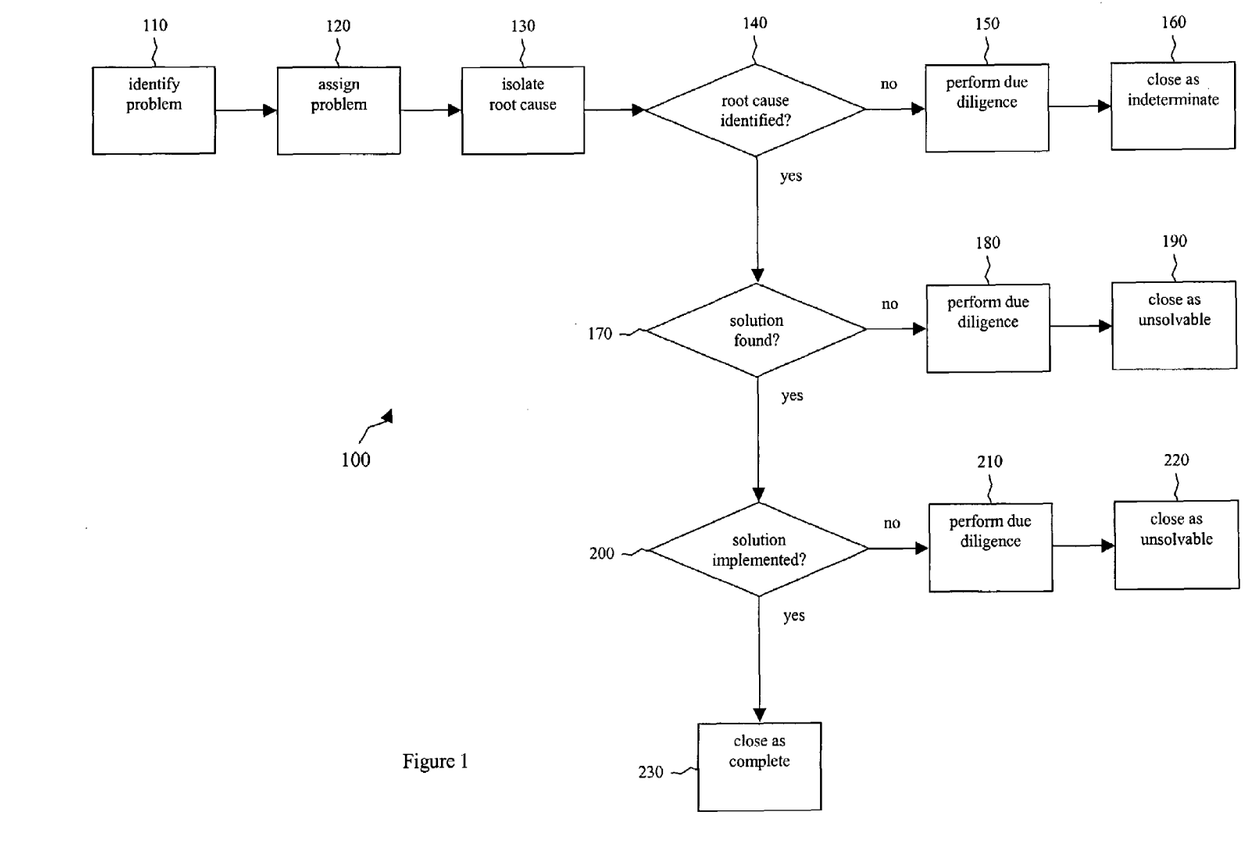
FIG. 1 illustrates a problem management process according to an embodiment of the present disclosure.

FIG. 1 illustrates an embodiment of a problem management method 100. In box 110, a problem is identified. That is, an analysis of data related to one or more incidents might indicate that a problem exists. Multiple incidents or problems can be observed and commonalities among them can be sought. Problem identification 110 can include identifying trends in incidents or problems and using those trends to define which aspects of the incidents or problems are to be monitored.

In box 120, a problem record or ticket can be created to keep track of information related to the problem. The problem might then be prioritized and assigned to an appropriate problem manager, who might diagnose the problem, provide the hands-on services needed to resolve the problem, oversee the problem resolution, or manage information related to the problem resolution.

In box 130, an attempt is made to isolate a root cause of the problem. This might include diagnosing a problem, determining and isolating the root cause for the problem, creating a workaround for the problem, determining whether a workaround is appropriate or whether a long-term solution should be sought, and updating a database containing problem-related knowledge.

In box 140, a determination is made whether the root cause of the problem can be identified. If the root cause cannot be identified, a due diligence investigation is performed in box 150 to ensure that adequate measures have been taken to identify the root cause. The due diligence investigation might include examining error logs, previous tickets, vendor information, reference materials, and other appropriate sources to verify that the root cause of the problem cannot be determined. The due diligence investigation might also include answering a series of questions related to the determination of the root cause of the problem. If the requirements for the due diligence process have been met, the ticket is closed in box 160 as indeterminate. The approval of a problem manager might be needed before the ticket is placed in the indeterminate status.

If, in box 140, it is determined that the root cause of the problem can be identified, the method 100 moves to box 170, where a determination is made whether a solution for the problem can be found. If a solution cannot be found, a due diligence investigation is performed in box 180 to ensure that adequate measures have been taken to find a solution for the problem. This due diligence investigation might also include examining error logs, previous tickets, vendor information, reference materials, and other appropriate sources to verify that a solution for the problem cannot be found. The due diligence investigation might also include answering a series of questions related to the discovery of a solution. If the requirements for the due diligence process have been met, the ticket is closed in box 190 as unsolvable. Problem manager approval might be needed before the ticket is placed in the unsolvable status.

If, in box 170, it is determined that a solution for the problem can be found, the method 100 moves to box 200, where a determination is made whether the solution will be implemented. In some cases, the cost of implementing a solution might be greater than the cost created by the problem. In such a case, a decision might be made not to implement the solution. If the solution is not implemented, a due diligence investigation is performed in box 210 to ensure that adequate measures have been taken to verify that a more cost-effective solution for the problem does not exist. This due diligence investigation might again include examining error logs, previous tickets, vendor information, reference materials, and other appropriate sources to verify that a cost-effective solution for the problem cannot be found. The due diligence investigation might also include answering a series of questions related to the costs and benefits of a solution. If the requirements for the due diligence process have been met, the ticket is closed in box 220 as unsolvable. Problem manager approval might be needed before the ticket is placed in the unsolvable status. While in the preferred embodiment both types are defined as unsolvable tickets, in other embodiments there might be a different statuses—one for actually unsolvable problems and another for economically unsolvable problems. In still other embodiments, these may have the same status but each have a defined sub-status or other means of categorizing so that the differences are readily identifiable.

If, in box 200, it is determined that a cost-effective solution for the problem can be found, the solution would typically be implemented. The method 100 could then move to box 230, where the ticket for the problem is closed as complete.

The due diligence investigations of boxes 150, 180, and 210 can consist of providing answers to a set of questions related to a problem. Different sets of questions might apply to potentially indeterminate problems and to potentially unsolvable problems. In either case, there might be general, high-level questions that apply to multiple types of problems and specific questions that apply to specific types of problems. For example, the general questions might deal with whether a problem is related to hardware or to software, whether a problem is related to a mainframe system or to a distributed system, which applications are associated with a problem, and similar questions. Depending on the answers to these general questions, different specific questions might then be asked.

For potentially indeterminate problems, the general questions that might be asked for all problems might include questions such as, "who is requesting this issue be set to indeterminate (i.e., fix agent, workgroup)?", "why does this team feel this issue should be set to indeterminate?", and "What steps have been completed to determine that root cause cannot be found?". The more specific follow-up questions might include questions such as, "have all the correct resources been engaged to investigate this issue?", "what monitoring/logging was in place when this issue occurred and why was this logging/monitoring insufficient to assist with root cause determination?", "is there currently a workaround for this issue and, if so, is it sufficient should this issue reoccur?", and "have there been any items identified that can be put in place to assist with root cause determination should this issue occur in the future (i.e., additional monitoring/ logging)?". These questions are given here only as examples and other relevant questions will present themselves to one of skill in the art.

For potentially unsolvable problems, the questions might include questions such as, "is there another solution and what percentage of the problem will it correct?", "at what point in time does the cost of the problem outweigh the cost of the solution?", "is the solution redeployable?", "who denied the original solution (e.g., a change management group, a fix agent, a change advisory board)?", and "is there a workaround for this issue and can the workaround be used in the long term?". Again, questions other than these examples will be evident to one of skill in the art.

Questions such as these can guide a due diligence investigation and ensure that a thorough examination of available options is conducted before a ticket is placed in the indeterminate or unsolvable status. It can then be assumed that any ticket in the indeterminate or unsolvable status has had adequate due diligence performed. This can be contrasted with previous systems where a ticket might be left in an 'open' status indefinitely and there might be no way to determine, based on an examination of the ticket status, the level of effort that had been placed into finding a solution for the problem described in the ticket.

Figure 2:
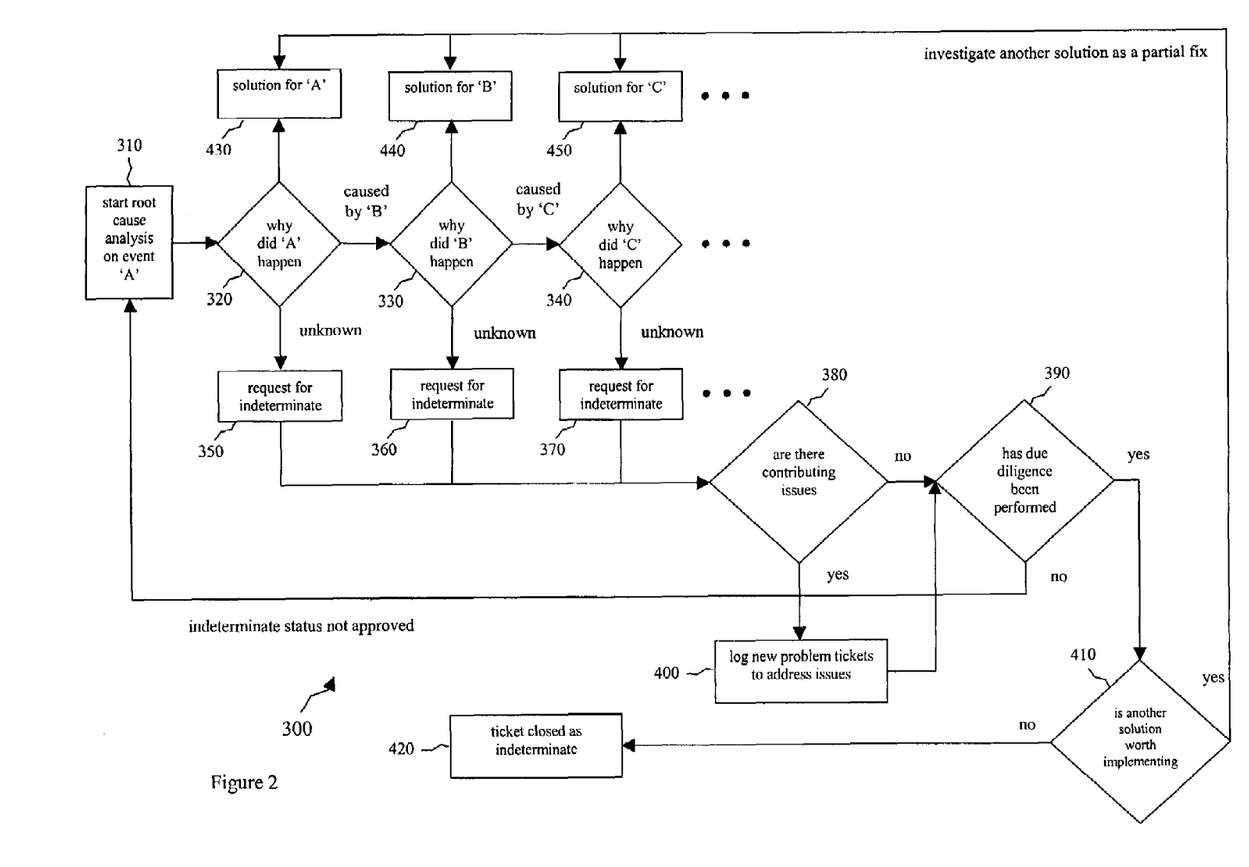
FIG. 2 illustrates a problem management process for indeterminate problems according to an embodiment of the present disclosure.

Details of the steps of placing a ticket in the indeterminate status, as depicted in boxes 130, 140, 150, and 160 of FIG. 1, are illustrated in the method 300 of FIG. 2. The method 300 might begin at box 310, where a root cause analysis of an incident or problem, referred to as event 'A', is begun. A determination might then be made in box 320 regarding why 'A' happened. If it is determined that 'A' was caused by another event, referred to as event 'B', further steps, as described below, can to taken to find the root cause of 'B'. If the root cause of 'A' is unknown, a request can be made in box 350 to place the ticket for 'A' in the indeterminate status.

A determination is then made in box 380 regarding whether there are any contributing issues related to 'A'. If there are contributing issues, then new problem tickets are logged to address the issues in box 400. A determination is then made in box 390 regarding whether due diligence has been performed. If, in box 380, it is determined that there are no contributing issues, the method 300 moves directly to box 390 where the determination of due diligence is made.

If it is determined in box 390 that due diligence has not been performed, the method 300 returns to box 310 where further analysis of the root cause of 'A' is performed and the above described process is repeated. If it is determined in box 390 that due diligence has been performed, the method 300 moves to box 410, where it is determined whether another solution worth implementing exists. If there is no other solution worth implementing, the ticket is closed as indeterminate in box 420. If another solution worth implementing exists, the other solution is investigated as a partial fix.

For example, if another potential solution for 'A' exists, the method 300 might move to box 430, where a solution for 'A' is implemented. If it was determined earlier in the method 300 that 'B' is the root cause of 'A', the method 300 might move from box 410 to box 440, where a solution for 'B' is implemented. An investigation might then be made in box 330 regarding why 'B' happened. If it cannot be determined why 'B' happened, the process can move to box 360, where a request for the ticket for 'B' to be placed in the indeterminate status can be made. Further steps in the method 300 can then be followed, as described above for 'A'.

If it is determined in box 330 that 'B' was caused by 'C', similar steps can be followed for 'C'. It can be seen that steps similar to steps 320, 350, and 430 for 'A', steps 330, 360, and 440 for 'B', and steps 340, 370, and 450 for 'C', etc., can be followed as many times as necessary until a solution is found for the ultimate root cause of the problem or until a ticket for the problem is placed in the indeterminate status.

Figure 3:
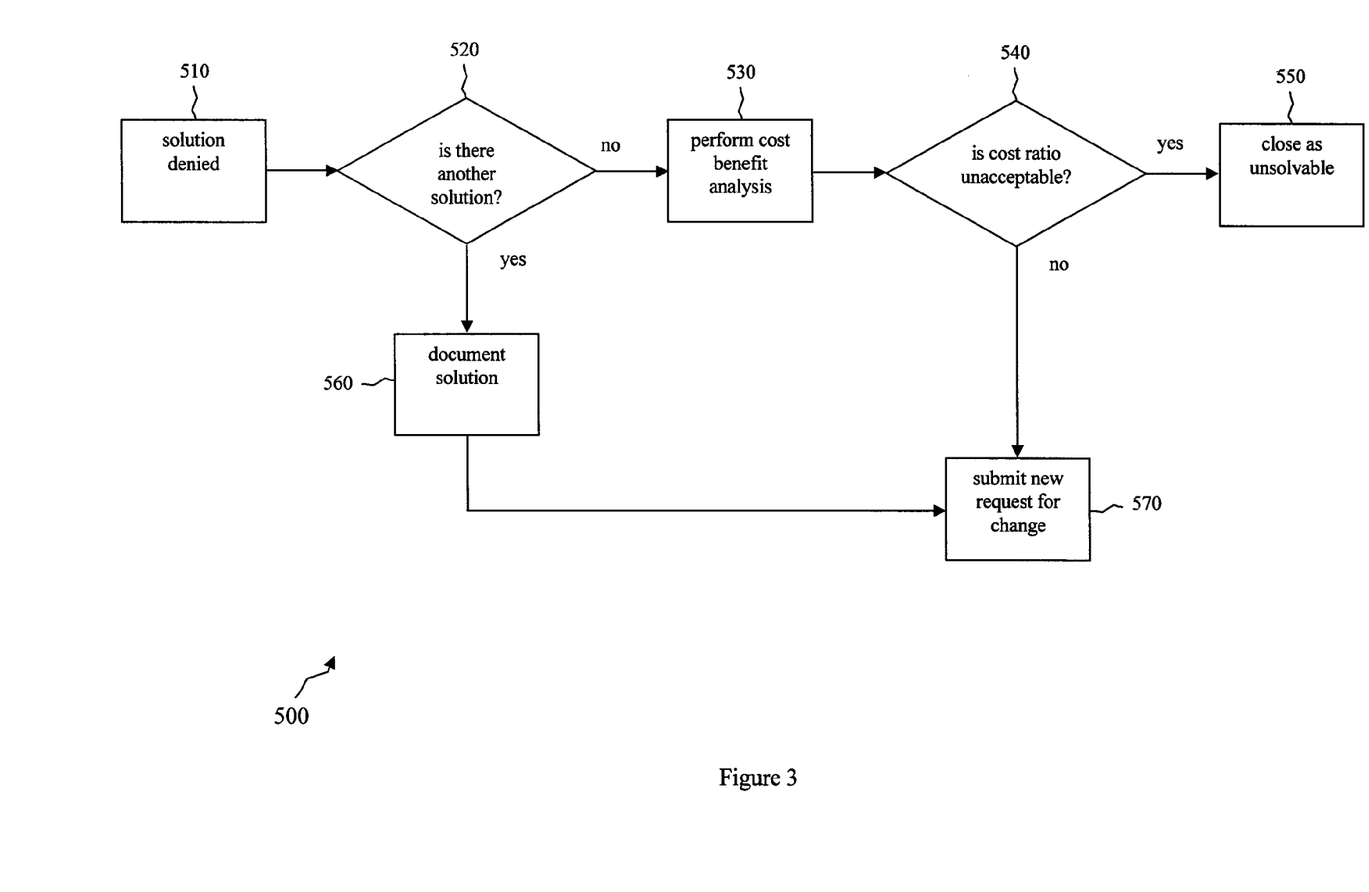
FIG. 3 illustrates a problem management process for unsolvable problems according to an embodiment of the present disclosure.

Details of the steps of placing a ticket in the unsolvable status, as depicted in box 130 and boxes 170 through 220 of FIG. 1, are illustrated in the method 500 of FIG. 3. The method 500 might begin at box 510, where a potential solution for a problem or incident is denied. In box 520, a determination is made whether there is another solution for the problem. If another solution can be found, the alternate solution is documented in box 560. A new change request is then submitted in box 570 to implement the alternate solution.

If, in box 520, it is determined that no other solution for the problem exists, a cost/benefit analysis is performed in box 530. The cost/benefit analysis determines whether the costs of implementing the existing solution exceed the costs of leaving the problem unsolved. If, in box 540, it is determined that the cost ratio is acceptable, that is, that the benefits of implementing the solution make the costs worthwhile, the method 500 moves to box 570, where a change request is submitted to implement the solution. If it is determined in box 540 that the benefits of the solution would be outweighed by the costs, the ticket for the problem is closed as unsolvable in box 550.

Trend analysis can be performed on tickets that have been placed in the indeterminate or unsolvable status to determine whether patterns exist in any of the parameters related to a group of problems. A parameter potentially related to a problem, such as an application or a portion of an application, a piece of hardware, an operating system, a workgroup, a problem category, the time of occurrence of a problem, the number of occurrences of a problem, a potential solution for a problem, or other parameters, can be referred to as a configuration item or a CI.

In an embodiment, records of all CI's potentially related to a problem are maintained. The relationships among the CI's are also recorded. When trend analysis is performed, the CI's for a group of problems and the relationships among the CI's are examined. If it is discovered that a particular CI is associated with multiple problems, further investigation into that CI may be warranted to determine if it is a cause of the problems. For example, if a particular problem tends to occur when a particular software application is executing, the application may be investigated as a cause of the problem.

Returning to FIG. 3, a cost/benefit analysis is performed in box 530. That is, a determination is made whether the costs of a proposed solution to a problem exceed the costs of the problem itself. If the costs of a solution outweigh its benefits, the problem is typically placed in the unsolvable status. In an embodiment, tickets in the unsolvable status are re-examined if the costs and/or benefits associated with a problem have changed since the time a due diligence investigation was performed for the problem. If the costs of a solution have decreased or the benefits of a solution have increased, a ticket that was previously closed as unsolvable might be reopened so that a solution can be implemented.

In one embodiment, the re-examination of unsolvable tickets occurs only when a change in costs or benefits for a solution has been known to occur. In an alternative embodiment, all or a portion of the unsolvable tickets are re-examined periodically to determine whether a change in costs or benefits has occurred for any of the tickets. The re-examination might be done by a human analyst or by an automated system that, for example, analyzes codes in the tickets specifying the costs and benefits associated with a problem.

Similar re-examinations might be performed on indeterminate tickets. That is, if a potential root cause is discovered for an indeterminate problem, a ticket describing the problem might be re-examined to determine if the ticket should be re-opened. Alternatively, periodic re-examinations might be done on some or all of the indeterminate tickets to determine if a root cause can be identified where none previously existed. Again, the re-examination might be done by a human analyst or by an automated agent.

Figure 4:
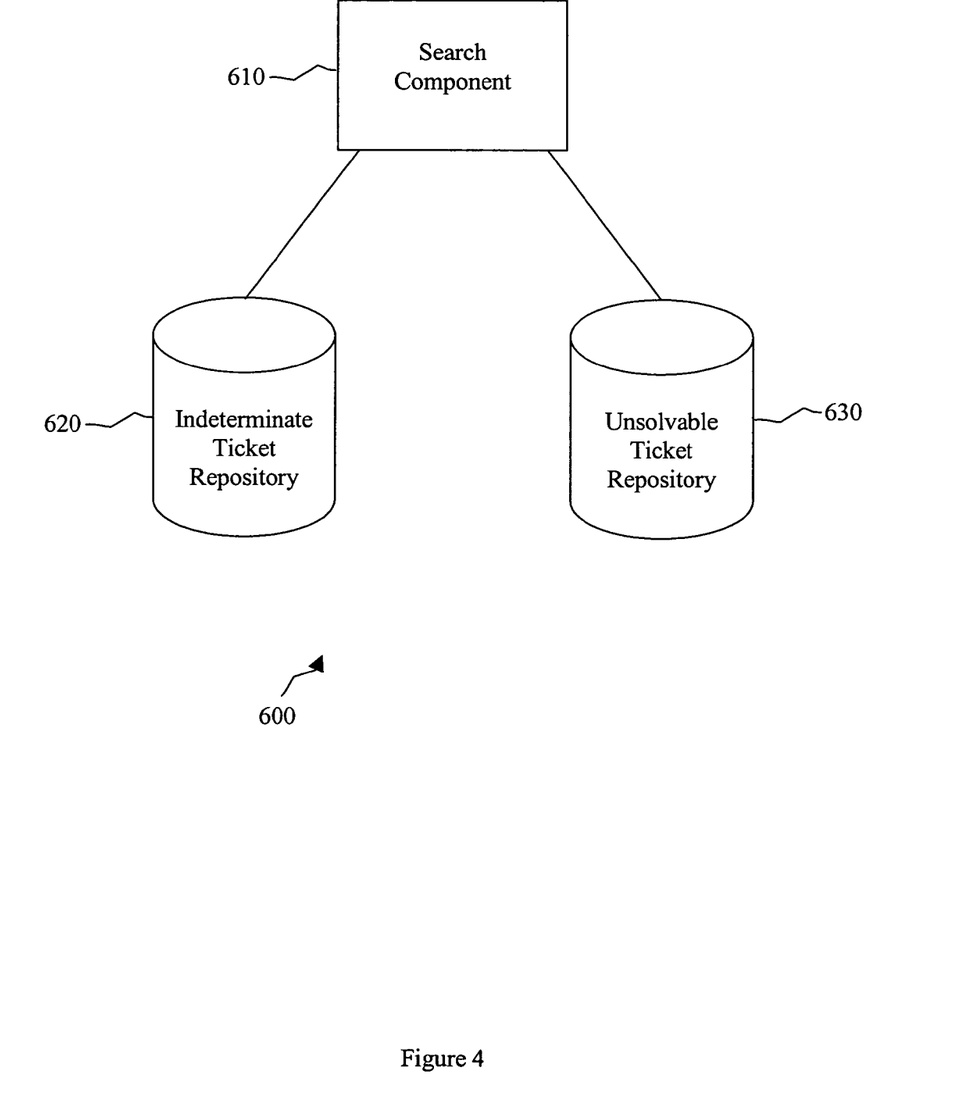
FIG. 4 illustrates a problem management system according to an embodiment of the present disclosure.

FIG. 4 illustrates a system 600 in which re-examinations and trend analysis of indeterminate and/or unsolvable tickets might occur. Indeterminate tickets are stored in an indeterminate ticket repository 620 and unsolvable tickets are stored in an unsolvable ticket repository 630. In other embodiments, the ticket repositories may be combined, or there may be multiple repositories or sub-repositories for both indeterminate and unsolvable tickets. A search component 610 examines the tickets in the indeterminate ticket repository 620 and/or the unsolvable ticket repository 630 to determine if any trends can be discerned in the tickets. The search component 610 might be an automated agent or a human analyst. The re-examinations of the indeterminate ticket repository 620 and/or the unsolvable ticket repository 630 might occur on a periodic basis or whenever new information suggests that a re-examination might be needed.

The search component 610 might also determine whether any tickets can be removed from the indeterminate ticket repository 620 or the unsolvable ticket repository 630. That is, the search component 610 might determine if a potential root cause exists for problems described by tickets in the indeterminate ticket repository 620, if a potential solution exists for problems described by tickets in the unsolvable ticket repository 630 where no solution previously existed, or if a cost-effective solution exists for problems described by tickets in the unsolvable ticket repository 630 where no cost-effective solution previously existed. Also where multiple tickets with the same problem are identified the cost-benefit analysis may change and perhaps make a previous solution that was not cost-effective for a single problem or incident worthwhile to fix multiple problems or tickets. A ticket might be reopened if a potential root cause, a potential solution, or a potential cost-effective solution is found.

Figure 5:
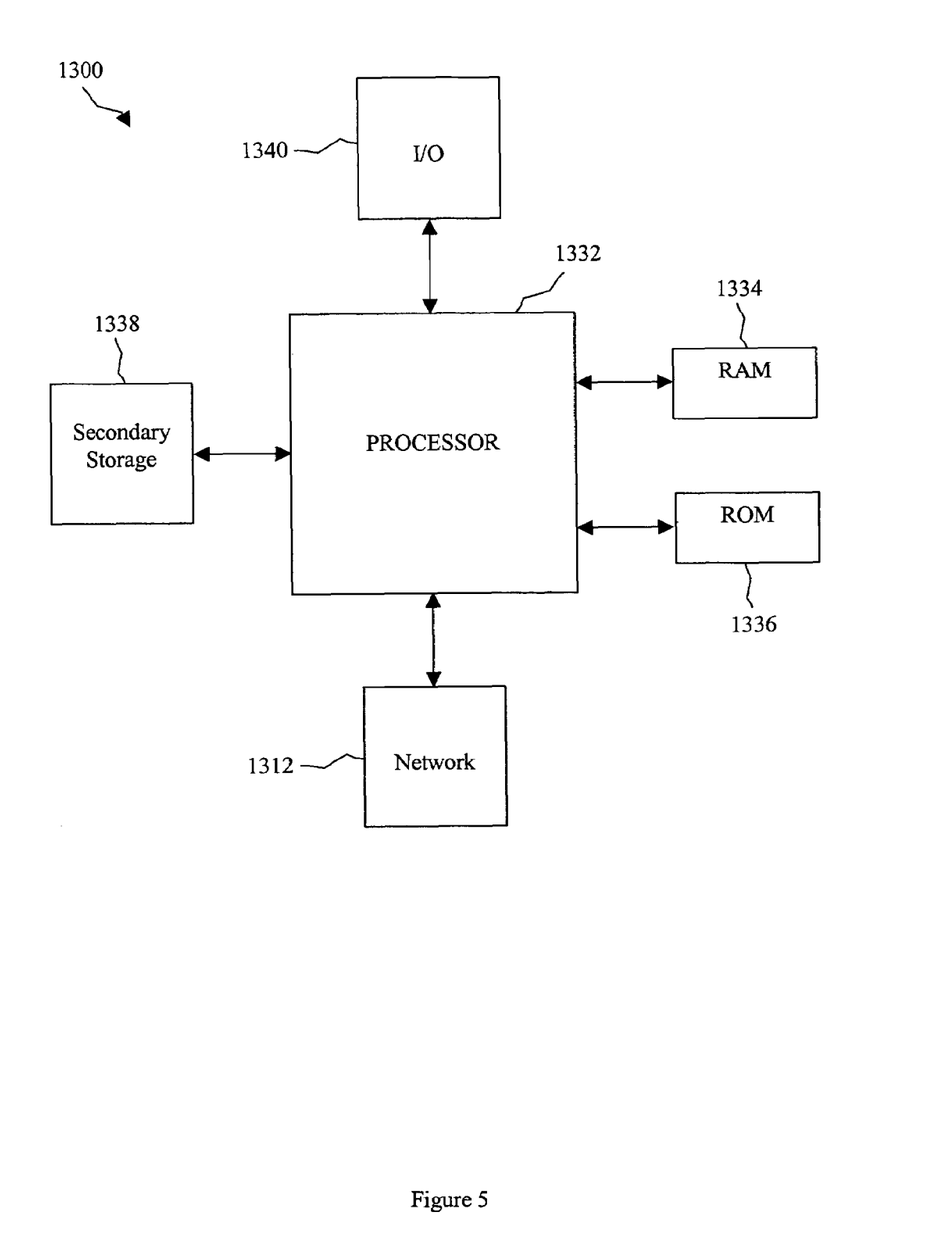
FIG. 5 is a block diagram of a computer system operable for some of the various embodiments of the present disclosure.

The system described above may be implemented on any general-purpose computer with sufficient processing power, memory resources, and network throughput capability to handle the necessary workload placed upon it. FIG. 5 illustrates a typical, general-purpose computer system suitable for implementing one or more embodiments disclosed herein. The computer system 1300 includes a processor 1332 (which may be referred to as a central processor unit or CPU) that is in communication with memory devices including secondary storage 1338, read only memory (ROM) 1336, random access memory (RAM) 1334, input/output (I/O) devices 1340, and network connectivity devices 1312. The processor 1332 may be implemented as one or more CPU chips.

The secondary storage 1338 is typically comprised of one or more disk drives or tape drives and is used for non-volatile storage of data and as an over-flow data storage device if RAM 1334 is not large enough to hold all working data. Secondary storage 1338 may be used to store programs that are loaded into RAM 1334 when such programs are selected for execution. The ROM 1336 is used to store instructions and perhaps data that are read during program execution. ROM 1336 is a non-volatile memory device that typically has a small memory capacity relative to the larger memory capacity of secondary storage. The RAM 1334 is used to store volatile data and perhaps to store instructions. Access to both ROM 1336 and RAM 1334 is typically faster than to secondary storage 1338.

I/O devices 1340 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 1312 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 1312 may enable the processor 1332 to communicate with the Internet or one or more intranets. With such a network connection, it is contemplated that the processor 1332 might receive information from a network or might output information to a network in the course of performing the above-described method steps.

Such information, which may include data or instructions to be executed using processor 1332 for example, may be received from and outputted to the network, for example, in the form of a computer data baseband signal or signal embodied in a carrier wave. The baseband signal or signal embodied in the carrier wave generated by the network connectivity devices 1312 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 1332 executes instructions, codes, computer programs, or scripts that it accesses from hard disk, floppy disk, optical disk (these various disk-based systems may all be considered secondary storage 1338), ROM 1336, RAM 1334, or the network connectivity devices 1312.

While several embodiments have been provided in the present disclosure, it should be understood that the disclosed systems and methods may be embodied in many other specific forms without departing from the spirit or scope of the present disclosure.

The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A computer-implemented method for categorizing problem tickets comprising:
    placing a first ticket for a first problem for which a root cause cannot be determined in an indeterminate category and closing the first ticket;
    placing a second ticket for a second problem for which a solution cannot be found in an unsolvable category and closing the second ticket;
    placing a third ticket for a third problem for which a solution can be found but will not be implemented in the unsolvable category and closing the third ticket;
    identifying an occurrence of a reexamining condition, wherein the reexamining condition comprises one of an elapsing of a specified period of time, a change in a cost benefit analysis for a solution, an identification of a new solution, identification of a new cause of problems, and an identification of a trend among a plurality of tickets;
    reexamining based on the occurrence of the reexamining condition one of the first, second, and third tickets and determining, with a problem manager stored as a set of computer readable instructions in a computer readable storage media and executable by a processor, whether a reopening condition has occurred, wherein a reopening condition comprises one of a change in the cost benefit analysis for a solution, identification of a potential root cause of a problem associated with one of the first, second, and third tickets, identification of a trend among a plurality of tickets associated with a problem that is associated with one of the first, second, and third tickets;
    reopening the one of the first, second, and third closed tickets when the reopening condition is determined to have occurred; and
    implementing one of an identified potential solution for the reopened ticket and a trend analysis for a group of tickets that include the reopened ticket.

2. The computer-implemented method of claim 1, further comprising conducting a due diligence investigation prior to the placing the first ticket in the indeterminate category and further comprising conducting a due diligence investigation prior to the placing the second and third tickets in the unsolvable category.

3. The computer-implemented method of claim 2, wherein the due diligence investigation conducted prior to the placing of the first ticket in the indeterminate category comprises:
    answering a set of questions related to a determination of a root cause of a problem described in the first ticket;
    when the answering of the set of questions related to the determination of the root cause of the problem indicates that adequate measures have been taken to discover the root cause, placing the first ticket in the indeterminate category; and
    when the answering of the set of questions related to the determination of the root cause indicates that adequate measures have not been taken to discover the root cause, conducting further investigation into the root cause.

4. The computer-implemented method of claim 3, further comprising conducting a trend analysis on a group of closed tickets placed in the indeterminate category to determine whether a commonality exists in the group.

5. The computer-implemented method of claim 3, further comprising periodically re-examining a closed ticket in the indeterminate category to determine whether the root cause of the problem has been discovered.

6. The computer-implemented method of claim 2, wherein the due diligence investigation conducted prior to the placing one of the second and third tickets in the unsolvable category comprises:
    answering a set of questions related to a potential solution to a problem described in one of the second and third tickets;
    if the answering of the set of questions related to the potential solution indicates that the potential solution will be ineffective, placing the one of the second and third tickets in the unsolvable category;
    if the answering of the set of questions related to the solution indicates that the potential solution will be effective, performing a cost/benefit analysis of the potential solution;
    if the cost/benefit analysis indicates that the cost of the potential solution exceeds the benefit of the potential solution, placing the one of the second and third tickets in the unsolvable category; and
    if the cost/benefit analysis indicates that the cost of the potential solution does not exceed the benefit of the potential solution, implementing the potential solution.

7. The computer-implemented method of claim 6, further comprising conducting a trend analysis on a group of closed tickets placed in the unsolvable category to determine whether a commonality exists in the group.

8. The computer-implemented method of claim 6, further comprising re-examining a closed ticket in the unsolvable category to determine whether a change in the cost/benefit analysis for a potential solution has caused the potential solution to become feasible.

9. The computer-implemented method of claim 8, wherein the re-examining occurs on a periodic basis.

10. The computer-implemented method of claim 8, wherein the re-examining occurs when a change in the cost/benefit analysis has been known to occur.

11. The computer-implemented method of claim 2, further comprising a project manager approving the placing of one of the first, second, and third tickets in one of the indeterminate and the unsolvable categories.

12. A method for problem management comprising:
    identifying a problem using an analyzing component stored as a set of computer readable instructions in a computer readable storage media and executable by a processor;
    assigning the problem to a problem manager stored as a set of computer readable instructions in a computer readable storage media and executable by a processor;
    determining, with the problem manager, a parameter that is related to the problem and associating the parameter and the problem with a problem ticket wherein the parameter comprises one of an application, a portion of an application, a piece of hardware, and operating system, a workgroup, a time of occurrence of the problem;
    attempting to isolate a root cause of the problem with the problem manager;
    if the root cause cannot be isolated, placing the problem ticket describing the problem in an indeterminate category;
    if the root cause can be isolated, attempting to find a solution for the problem;
    if a solution cannot be found, placing the problem ticket in an unsolvable category;

if a solution can be found, determining based on a cost-benefit analysis whether the solution is substantially economically justified;

if the solution is not economically justified, placing the ticket in the unsolvable category;

if the solution can be economically justified, implementing the solutions examining a plurality of other problem tickets in at least one of the indeterminate category and the unsolvable category for problem tickets sharing at least one common parameter with the problem ticket; and re-opening the problem ticket when at least one other problem ticket from one of the intermediate category and unsolvable category includes a parameter common to the problem ticket and performing a trend analysis on the problem ticket and the at least one other problem ticket to determine a root cause.

13. The method of claim 12, further comprising conducting a due diligence investigation prior to the placing of the ticket in one of the indeterminate and the unsolvable category.

14. The method of claim 13, further comprising conducting a trend analysis on a group of closed tickets placed in at least one of the indeterminate category and the unsolvable category to determine whether a commonality exists in the group.

15. The method of claim 14, wherein the trend analysis comprises searching for a commonality between at least two of:

at least one of a set of applications related to the problem;

at least one of a set of portions of applications related to the problem;

at least one of set of a pieces of hardware related to the problem;

at least one of set of operating systems related to the problem;

at least one of a set of work groups related to the problem;

at least one of a set of times of occurrence of the problem;

at least one of a number of occurrences of the problem; and at least one of a set of potential solutions for the problem.

16. The method of claim 15, further comprising periodically re-examining closed tickets in the indeterminate category and the unsolvable category to determine if a ticket can be moved to a different category.

17. A computer-implemented system for managing problems comprising:

an indeterminate ticket repository stored in a computer readable storage media to retain at least one problem ticket describing a problem for which a root cause cannot be identified;

an unsolvable ticket repository stored in a computer readable storage media to retain at least one problem ticket describing a problem for which a solution cannot be found and at least one problem ticket describing a problem for which a solution cannot feasibly be implemented;

an automated search component stored as a set of computer executable instructions in a computer readable storage media executable by a processor to search for a trend in the problem tickets, to reexamine the at least one problem ticket to determine whether conditions have changed and responsive to sufficient changes in conditions, reopening the one of the at least one problem ticket;

a reexamining component stored as a set of computer executable instructions in a computer readable storage media executable by a processor to identify an occurrence of a reexamining condition, wherein the reexamining condition comprises one of an elapsing of a specified period of time, a change in a cost benefit analysis for a solution, an identification of a new solution, identification of a new cause of problems, and an identification of a trend among a plurality of tickets and to reexamine, based on the occurrence of the reexamining condition, one of the first, second, and third tickets and to determine whether a reopening condition has occurred wherein a reopening condition comprises one of a change in the cost benefit analysis for a solution, identification of a potential root cause of a problem associated with one of the first, second, and third tickets, identification of a trend among a plurality of tickets associated with a problem that is associated with one of the first, second, and third tickets; and a reopening component stored as a set of computer executable instructions in a computer readable storage media executable by a processor to reopen the one of the first, second, and third closed tickets when the reopening condition is determined to have occurred and to implement one of an identified potential solution for the reopened ticket and a trend analysis for a group of tickets that include the reopened ticket.

18. The system of claim 17, wherein a due diligence investigation is conducted prior to a problem ticket being placed in one of the indeterminate ticket repository and the unsolvable ticket repository.

19. The system of claim 18, wherein the due diligence investigation comprises answering a set of questions related to a determination of a proper ticket repository into which a problem ticket can be placed.

20. The system of claim 17, wherein the automated search component periodically re-examines at least one of the indeterminate ticket repository and the unsolvable ticket repository to determine if tickets can be removed from at least one of the indeterminate ticket repository and the unsolvable ticket repository, and wherein the unsolvable ticket repository is further defined as multiple sub-repositories.

* * * * *